Dec. 23, 1930.　　　J. W. SCOTT　　　1,785,982
MATERIAL CARRIER
Filed Oct. 26, 1926　　3 Sheets-Sheet 1

Inventor
John W. Scott
By his Attorney
Frank J. Kent

Dec. 23, 1930.    J. W. SCOTT    1,785,982
MATERIAL CARRIER
Filed Oct. 26, 1926    3 Sheets-Sheet 2
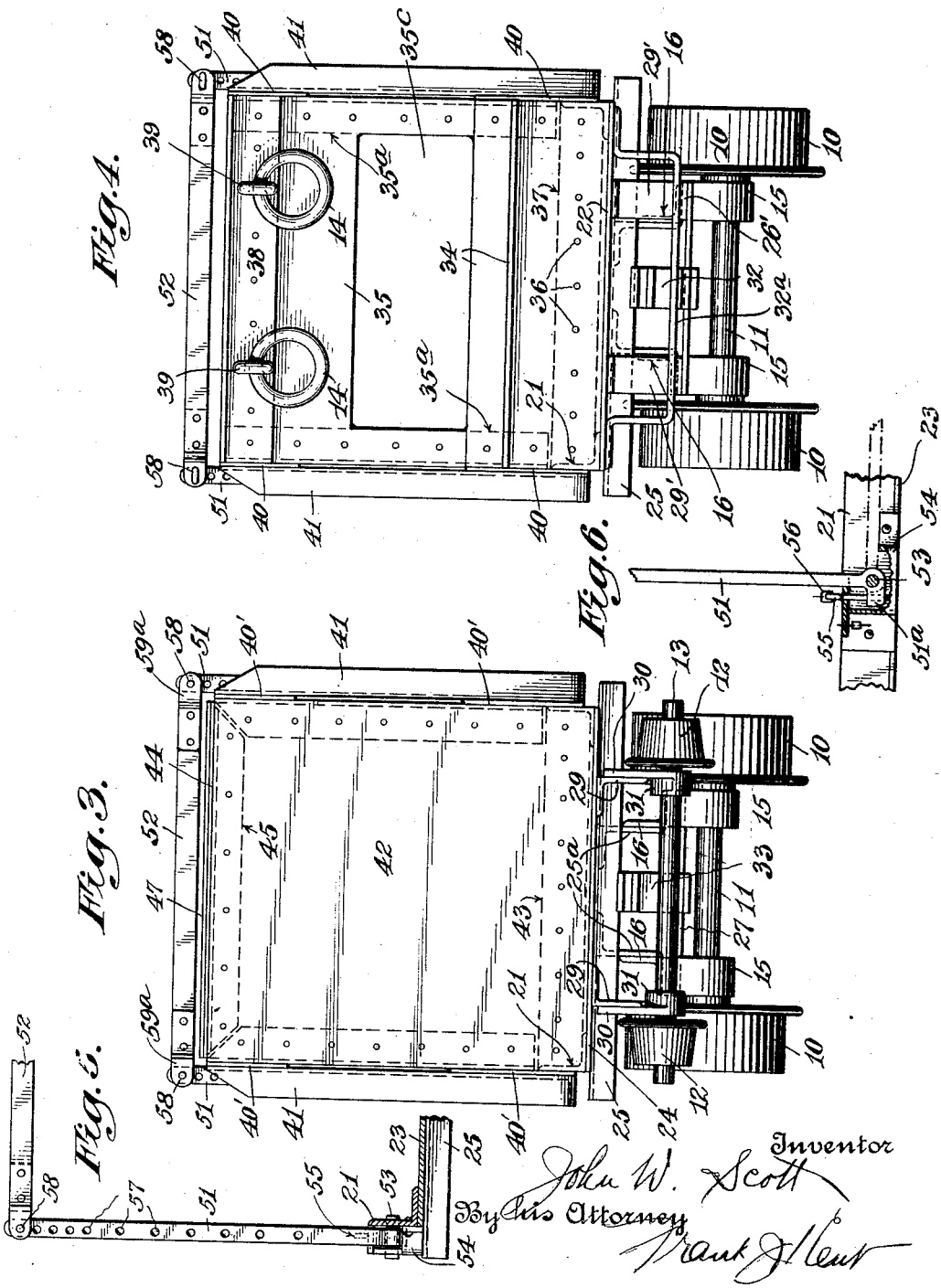

Dec. 23, 1930. J. W. SCOTT 1,785,982
MATERIAL CARRIER
Filed Oct. 26, 1926 3 Sheets-Sheet 3
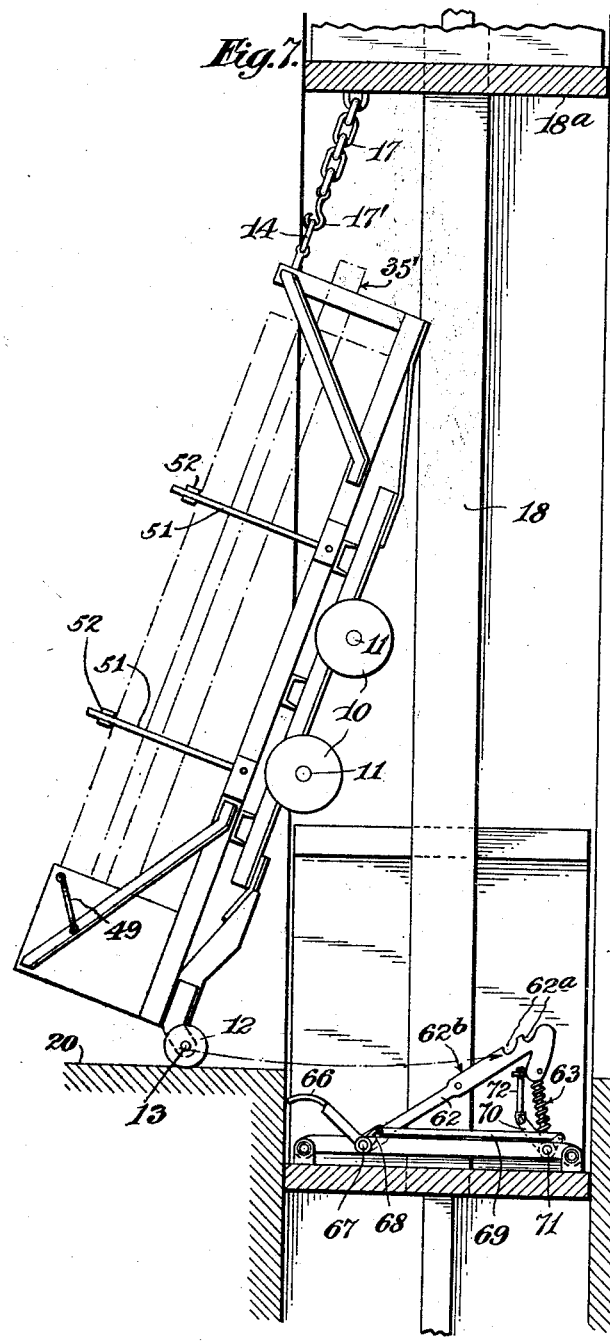
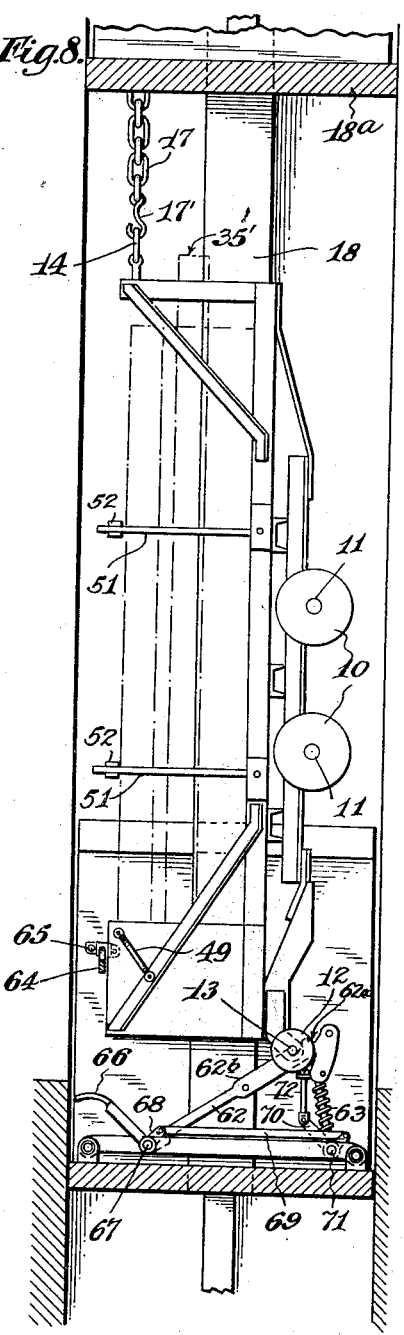
Inventor
John W. Scott
By his Attorney
Frank J. Kent Patented Dec. 23, 1930

1,785,982

UNITED STATES PATENT OFFICE

JOHN WILLIAM SCOTT, OF BISBEE, ARIZONA

MATERIAL CARRIER

Application filed October 26, 1926. Serial No. 144,273.

This invention relates to material handling, and has for its principal object the provision of a material carrier, preferably of the wheeled or car type, adapted for the transportation of material without intermediate loading between the supply point and the point of destination, where the travel of the carrier from one of said points to the other involves inclined and even vertical transportation, as well as horizontal transportation or transportation along an approximately horizontal path at the ground "level", at a subterranean level (as, for instance, in mining operations), or at any other level.

Thus an important object of the invention, especially when carried out in connection with underground workings, is to provide a truck or car so constructed and equipped that the same may be loaded at the surface or at a station underground, then swung vertically into a cage in a hoistway or well, then uncaged at a different level from the loading level, and then run along at the last-mentioned level to the point where the timber or other material is needed and there unloaded for the first time, so as completely to do away with the handling and rehandling of material to and from trucks and cages or the like as heretofore.

Another object is to provide a material handling truck or car as above described, and one which may, when desired, run on tracks laid at a particular level, and clear away from and alight upon said tracks incident to delivery to discharge from a cage or other elevating means; all without the aid of more than one attendant, and without imposing on such attendant other than a series of easily and quickly performed and comparatively light tasks.

Another object is to provide a material handling truck or car for permitting vertical, inclined and horizontal transportation of material without intermediate loading, which may be transferred from a horizontal line of travel to a vertical one, or vice versa, primarily by the power available at the hoist-cage or other elevating means employed for the vertical path of travel, and at the same time without dragging or other damage to or appreciable frictional resistance from either end of the truck or car.

Another object is to provide a material handling truck or car operable as and with the advantages just described, and which, for maximum load capacity, may have a flat bottom from end to end, be of considerable length, and at the same time be adapted for movement around fairly sharp corners or at fairly sharp rail curves in narrow passages at a particular level, due to a then functioning wheel sufficiently near to the middle of the car.

Another object is to provide a material handling truck or car for transport as one unit with its load, according to the invention broadly, and which has a load-housing superstructure above its running gear of great strength and rigidity, of considerable lightness, and of wide adjustability in regard to loads of various kinds, as to kinds of material loaded as well as to the magnitude of any particular load.

Another object is to provide a material handling truck or car for transport as one unit with its load, according to the invention broadly, and which has a load-housing superstructure including a readily adjustable means for retaining against shift a "short load" while maintaining the center of gravity of car and load at such point as always naturally to facilitate utilization of the power available at the hoistway to transfer the car and its load to and from said hoistway.

Various other objects and advantages of the invention will be specifically pointed out or apparent hereinafter, in the course of a description of a preferred one of the various possible forms of the invention as shown in the accompanying drawings; it being understood, of course, that such is merely illustrative of one combination and arrangement of parts calculated to obtain the objects of the invention, pursuant to present preference, and hence the detailed description of such form now to be given is not to be taken as at all defining or limiting the invention itself. That is to say, the scope of protection contemplated is to be taken solely from the appended claims, interpreted as broadly as is consistent with the prior art, and with explanatory reference to the specification only where a claim is ambiguous or to be impliedly limited beyond its express terms to avoid such art in order to save the validity of said claim.

In said drawings.

Fig. 3 shows the car in end elevation, facing the trail-end;

Fig. 4 is a similar view, facing the lead-end;

Fig. 5 is an enlarged fragmentary detail view, being a section approximately on the line 5—5 of Fig. 2;

Fig. 6 is a similar detail view, looking toward the right in Fig. 5;

Figure 1:
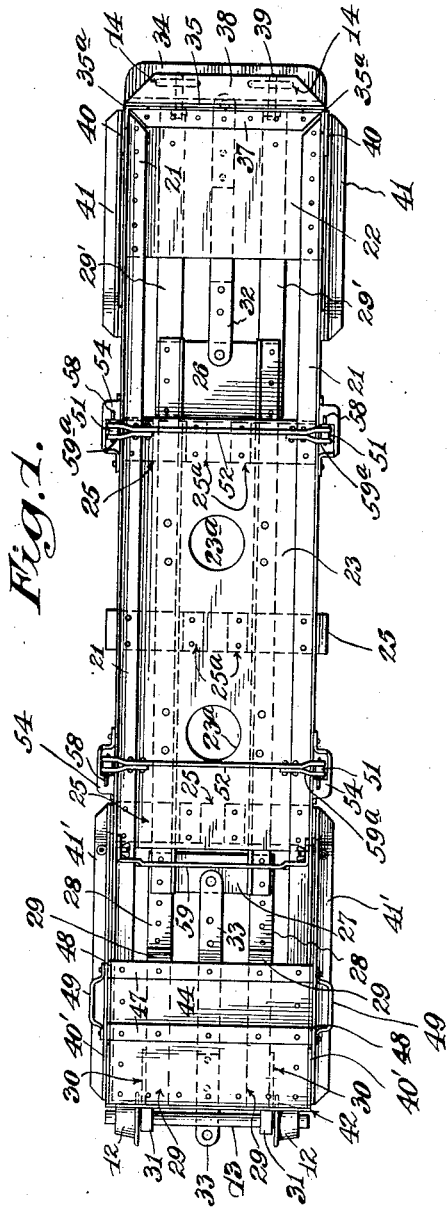
Fig. 1 shows one form of car pursuant to the invention, in top plan.

Fig. 7 shows the car during delivery to a hoistway or elevator, with the car's lead-end chain-supported from an upper part of a partially elevated shaft-cage and with the car's trail-end ready to swing into the lower part of such cage on a further slight rise thereof; and Fig. 8 shows the cage moved slightly higher than as shown in Fig. 7, and the car swung completely into the same to hang vertically therein.

The car of course may be of any desired size or load capacity, according to the special requirements of the erecting, wrecking, routing, mining or other material-handling situation, but naturally due regard will be had to the dimensions of the hoistway or elevator-well and of its cage, conveyor chains or the like for moving freight up and down the well, if a well and cage already installed are to be employed pursuant to the invention, and if the up-ending and suspension means for the car are like those shown in the drawings. As will be understood from what has already been said, the new car is designed to travel toward or away from a hoistway at a particular level, as well as for travel up or down in such hoistway, to transfer the car and its load as one unit from one level to another.

To these ends, the car includes, in the preferred form shown in Figs. 1 to 6, a set of main wheels 10, here illustrated as track wheels arranged in two pairs on two axles 11 located near the middle of the car; a pair of smaller wheels 12, on an axle 13, slightly elevated, at the trail-end of the car; and a pair of swing-rings 14, near the top of the car and at the lead-end thereof. The main wheels 10, forming with the axle-journals 15 parts of a truck 16, support the car for movement as an ordinary wheeled car or as one of a train of several cars. The new car, however, may be readily raised at its lead-end, as by means of the rings 14. The car is thus raised when these rings are pulled up by suitable hoisting chains or the like, such as the pair of parallelly suspended and swinging chains 17 of Figs. 7 and 8, anchored at their upper ends to the upper part or roof 18a of a hoisting cage 18, and engaged by way of hooks 17' at their lower ends with the rings 14 on the car. Due to the dispositions of the upper ends of the chains 17 in the cage 18, and due to the dispositions of the rings 14 on the car, relative to the center of gravity of the car or of the car and a load of material secured thereon, the car may be readily raised so high at its lead-end, merely by hoisting properly the cage 18, that the trail-end of the car can swing fully into the cage in said manner that the entire car will naturally tend to hang truly vertical and thus be disposed in a cage having inside dimensions very slightly greater than the over-all dimensions of the fully loaded car. The smaller wheels 12, hereinafter called the loading and unloading wheels, come into play, at the level at which the car is being loaded onto or unloaded from the cage or other hoisting means in the hoistway, while the car is finally swinging toward the vertical, in the hoistway or is being first swung toward the horizontal from the hoistway. Examine Fig. 7 in this connection; the wheels 12 have been for some past upward travel of the cage 18 in rolling contact with the loading level 20. The advantage of disposing the wheels 12 as shown, is that these wheels make rolling contact with the level 20 as soon as the lead-end of the car is lifted sufficiently by the rising cage to rock the car slightly about the rear axle 11 (the lower axle 11 of Fig. 7). In other words, with the last-mentioned axle fairly close to the middle of the car, as is desirable in providing an equipment of wheels 10 for permitting the car to turn sharp corners whenever required during normal movement on a particular level, the car bottom at the trail-end thereof, especially if made flat for maximum load capacity, would be unprotected against dragging and scraping during a large part of the up-ending of the car, were there not present the auxiliary wheels 12 or an equivalent. Similarly, the trouble would be even more serious, during out-swinging of the trail-end of the car in transferring the car and its load from the hoistway to a delivery level.

With the loading and unloading wheels 12 present, however, a transfer of the car and its freight to the hoistway at any level, whether such hoisting be inclined, or vertical as illustrated, is easy and quick, being practically automatic, when the cage or other conveyor-means in the hoistway is properly manipulated; while a transfer of the car and its freight from the hoistway to any level is equally quick and easy, even in a vertical hoistway, once an attendant has swung the lower end of the car outward to engage the wheels 12 with the delivery level during slow downward movement of the cage in the well.

Yet, as already pointed out, it will be noted that the car body may be constructed to have a flat bottom, and thus constructed as a rectangular box car, having side and end walls at right angles to the flat bottom and to each other; for maximum loading capacity and maximum loading convenience.

Figure 2:
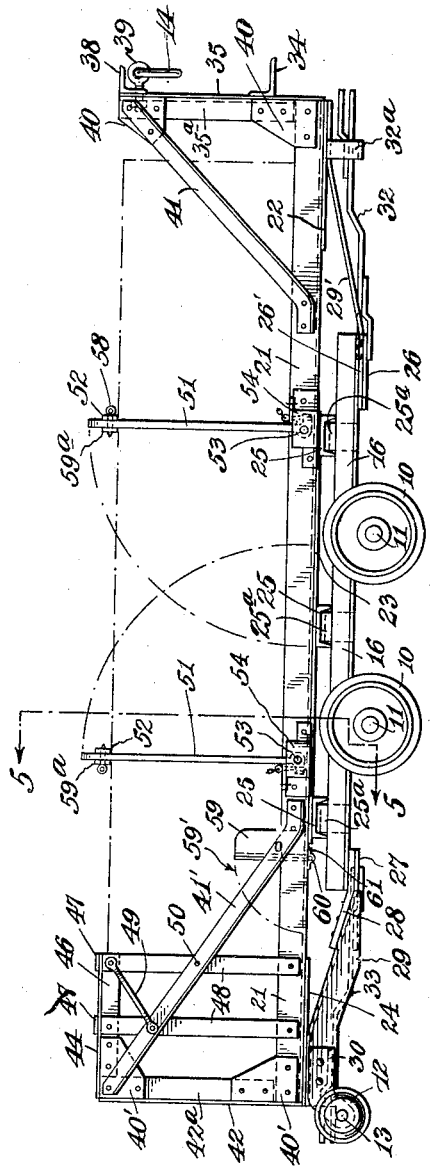
Fig. 2 shows said car in side elevation.

Such car body may be of any desired construction; but, as here shown, is of skeleton type, as illustrated clearly in Figs. 1 and 2.

Even the flat bottom is partially of skeleton construction, including side angle pieces 21 having lower inwardly directed flanges riveted to and over floor plates 22, 24, and 23, respectively located at the lead-end of the car, at the trail-end thereof, and midway of such ends. The middle plate 23, several times the size of the end plates 22 and 24, may be provided with a plurality of lightening holes as indicated at 23a in Fig. 1. Such a large middle plate is a convenient means for mounting the truck 16. Said plate has riveted to its underside three transverse channels 25, which are in turn riveted to the horizontal flanges of angle brackets 25a the vertical flanges of which are riveted to said truck. The truck itself is very light, being really made up merely of a pair of spaced angle strips joining the two journals 15 for the axles 11 on which the main wheels 10 are mounted. These angle strips extend beyond both ends of the middle plate 23. Riveted to the horizontal flanges of said angle pieces just beyond the forward end of the middle plate 23, are blocking pieces 26' and a wide cross plate 26, and riveted to the same flanges, just beyond the rear end of said middle plate, is a cross plate 27, somewhat narrower than the cross plate 26. The cross plate 27 is not riveted directly to the truck flanges, spacer bars 28 being interposed between cross plate 27 and said flanges. These bars are upwardly obtusely bent as shown best in Fig. 2; and their upwardly bent portions are riveted as indicated in Fig. 1 to the inwardly directed upper flanges of a pair of spaced hangers 29. As will be seen from a comparison of Figs. 1 and 2, these hangers are of inverted L cross section.

Said hangers are really auxiliary truck members, because their inwardly directed upper flanges, where horizontal and where they lie flat under bottom plate 24, as indicated at the extreme left of Fig. 2, are riveted to the under side of said plate, and brackets 30, carrying journals 31 for the axle 13 on which wheels 12 are mounted, are riveted to the hangers. As will be seen from Figs. 1, 2 and 3, these brackets include flat vertical plates riveted flat against the outer faces of the depending vertical flanges of the hangers 29.

As indicated in Fig. 3, it is recommended, especially where the wheels 10 are track wheels, that the auxiliary wheels 12 be set somewhat wider apart than said wheels 10, if all the wheels are not set to the same gage.

At 32 and 33, respectively, are indicated draw bars for the lead-end and trail-end of the car. Draw-bar 32 is pivoted to cross plate 26; and draw bar 33 is pivoted to cross plate 27. Draw bar 32 plays near its forward end within a cradle bar 32a.

The lead-end of the car may be provided with a bumper 34, found to be particularly desirable when the car is to be intended also for possible use as one of a train of several cars, for ordinary travel along a path at a particular level.

Just as the hangers 29 serve to connect and brace the rear ends of the truck 16 and the car bottom, two straps 29' are provided to connect and brace the forward ends of the truck and the car bottom. It is recommended, and as the invention is now understood it is believed to constitute an important feature thereof, that the car body include a permanent superstructure which is chiefly at the two ends thereof.

In the present case, the forward superstructure unit is illustrated as including a front plate 35 having at its opposite sides vertical flanges 35a; such plate at its top and at its bottom riveted as indicated at 36 in Fig. 4 to the upstanding vertical flange of an angle-piece 37 the bottom horizontal flange of which is riveted as shown in Fig. 1 to floor-plate 22.

Front-plate 35 has a very large rectangular cut-out as shown best in Fig. 4, so as to constitute a rectangular frame carrying along its top stretch an angle-piece 38 to aid in rigidifying the plate and to make a very strong anchorage for a pair of horizontally spaced eyes 39 carrying the suspension rings 14. Near the bottom of the front-plate 35 the bumper 34 is riveted in place; the top of the bumper marking about the bottom of said rectangular cut-out.

Such a cut-out provides at the lead-end of the car an opening 35c through which pieces of material, as long timbers loaded on the car, may be protruded, as indicated at 35' in Fig. 7. At opposite sides of the front plate 35, top and bottom gusset plates 40 are riveted to the side flanges 35a of said plate; and angle pieces 41, constituting inclined struts at opposite sides of the car, are riveted at their tops to the upper gusset-plates 40 and at their lower ends to the upstanding vertical flanges of side angle-pieces 21. Lower gusset plates 40 are riveted also to the last mentioned flanges.

The trail-end superstructure unit is illustrated as including a roofed over compartment having an open front end and slatted sides; the structural elements of such compartment comprising a back-plate 42, riveted at its bottom to an angle-piece 43 (Fig. 3) similar to the floor angle-piece 37 at the front end of the car, this angle-piece 43 having its bottom flange riveted to rear floor plate 24; a roof-plate 44, riveted at its rear under edge portion to an angle-piece 45 (Fig. 3) to which the upper forward edge portion of back-plate 42 is riveted; angle-pieces at opposite sides of the car riveted to the side under edge portions of the roof-plate 44, and having depending flanges, such as the one indicated at 46 in Fig. 2; vertical angle-pieces 42a, similar to the angle-pieces 35a of the forward superstructure unit, riveted to the back-plate 42; top and bottom gusset-plates 40', corresponding to the gusset-plates 40 of the forward superstructure unit, and riveted to the various overlapping angle-pieces as clearly shown in Figs. 1, 2 and 3; top stiffener-strips 47 riveted onto roof-plate 44; and vertical slats 48 at opposite sides of the car riveted at their upper and lower ends to angle-pieces 46 and 21.

Angle-pieces 41', constituting inclined struts at opposite sides of the car, and corresponding in function to the angle-pieces 41 of the front superstructure unit, are riveted at their tops to the upper gusset plates 40' and at their lower ends to the upstanding vertical flanges of side-angle pieces 21.

At opposite sides of the car, handles 49 are riveted in place as shown, so that the rivet at the lower end of each of said handles also locks one of the slats 48 on the same side of the car to the intersecting strut angle-piece 41'. At each side of the car, also, the other slat 48 is riveted to the strut angle-piece as indicated at 50 in Fig. 2.

Handles 49 are used by one or more attendants in guiding the car as it is being loaded onto or unloaded from the elevating device, as the cage 18 shown in Figs. 7 and 8.

Various means for retaining the load on the car may be provided. For merely a plurality of long rods, pipe, timbers or the like, up to an aggregate such that portions of all the pieces of the load could be protruded through cutout 35a in front plate 35 while the opposite end portions of said pieces are tucked in under roof plate 44 of the trail-end superstructure unit, the car so far described would act satisfactorily pursuant to the invention.

The invention also aims, however, to provide a superstructure for the car so constructed that considerably shorter pieces of material may be handled, either alone or in combination with longer pieces; as well also as a superstructure so constituted that whatever be the character of the load, the same may be retained at a plurality of points along the length of the car and thus all load components securely held down, however heterogeneous be the pieces composing the load. To these ends I prefer to arrange along the length of the car a plurality of pairs of side standards and retaining bars for the tops of such standards, one bar for each pair of standards. Two of such pairs of standards are indicated in the drawings, at 51, and the two retaining bars at 52.

In the present case, each of these retaining means 51, 52, and now see Figs. 5 and 6 as well as Figs. 1 and 2, is constructed as follows: Each standard 51 is pivotally mounted at its bottom at one side of the car, on a pin 53 set in angle-piece 21 and in a box 54 on said angle-piece, so that said standard may be swung down, as indicated by dot and dash lines in Fig. 2, to lie outside the loading chamber defined by the skeleton frame-work, or arranged as shown in said Fig. 2, before or during the course of loading such chamber. In order to provide means for locking a standard thus upright, each standard at its bottom carries an offset portion or foot 51a, provided with a through aperture which when the standard is upright is vertically disposed for the reception of a drop-pin 55. When a standard is to be lowered as shown in dot and dash lines in Fig. 6, this pin may be lifted clear of box 54. In order to avoid loss of the pin, the same is carried on a chain the terminal links of which are indicated at 56 in Fig. 6. As shown best in Fig. 5, each standard is provided with a series of bolt holes 57, so that the retaining bar 52 for that pair of standards may be secured in place to the standards at the proper height to bear down tightly on top of the load. Eye-bolts 58, which may coact with forks as indicated at 59a in Fig. 2, are employed for securing the bars 52 to the standards 51 when the former are properly adjusted on the latter. It will of course be understood that it is desirable that the bars 52 be disconnected from the standards when the latter are swung down as indicated by dot-and-dash line in Fig. 2, so as not to reduce in any way the load capacity of the car.

The invention further provides, as a preferably present feature, a means for retaining and supporting a heavy load of short material in such a position in the loading chamber of the car that the center of gravity of the entire load will be at the proper point to facilitate transferring the car to or from an inclined or vertical hoistway, say while suspending the car from the rings 14 by the chains 17 as shown in Figs. 7 and 8. In the present case a very simple addition to the superstructure is shown, for attaining this object. Such means comprises a U-shaped cross-plate or abutment member 59 (see Figs. 1 and 2) having portions (not shown) near its bottom as seen in Fig. 2 crimped or curled about pivot pins 60 set in brackets 61 at opposite sides of the car. Thus the element 59 may be arranged as shown in full lines in Figs. 1 and 2, or swung down as indicated by the dot and dash curve 59' of the latter view. It will be seen from Fig. 1 that the shape of this element is such that when it is thus swung downward it does not affect the load capacity of the car relative to a long load. However, when said element 59 is arranged as shown in Figs. 1 and 2, in which disposition it may be locked by applying the eye bolts and wing nuts clearly shown in Figs. 1 and 2, a short load may be placed on the car, with its rear limit at said element 59, and then one or both of the sets of standards 51 and retaining bars 52 may be applied as above to hold the short load against shift.

Referring finally to Figs. 7 and 8, in which views it will be noted that the car is shown more or less diagrammatically, there is disclosed a means particularly adapted for use in a cage in a vertical hoistway, for engaging and latch-locking the car along a line substantially diagonally opposite the line of suspension rings 14, after the car has naturally assumed or been forced to assume a vertical suspension within the cage. This means is fully described and claimed in my copending application Serial No. 144,274, filed October 26, 1926, now Patent No. 1,697,824 of January 1, 1929. Briefly described, the same includes one or more inclined bars 62 carrying one or more notches 62a for engaging axle 13 or a similarly located element of the car; the ramp feature 62b being preferably present so that as the car swings in from the location shown in Fig. 7 toward the location shown in Fig. 8, the bar will be depressed by such axle against the expansible spring or springs 63 and thus cause a notch 62a to be snapped about said axle when the car becomes disposed as shown in Fig. 8. When the cage arrives at the delivery level, the lower end of the car may be detached from the bar 62 by depressing a pedal 66 pivoted at 67 and carrying an integral arm 68 connected by a link 69 to a bell-crank lever 70 pivoted at 71. Depression of the pedal 66 rocks said lever to actuate a pull rod 72 to swing down bar 62 against the compression of the spring or springs 63.

If desired, the car may also be held in vertical position, during ascent or descent of the cage 18, by dropping down across the front of the lower portion of the cage a retaining bar 64 pivoted to one side of the cage and adapted to be dropped into a suitable keeper on the other side of the cage. Such a bar is familiar in the art of elevating; a pivotal mount of the kind just referred to being indicated in Fig. 8 at 65.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language contained in the following claims is intended to cover all the generic and specific features of the invention herein described and all statements of the scope of the invention which, as a matter of language, might be said to fall therebetween.

I claim:

1. A car for handling material comprising a body, two axles secured below the body, each axle being nearer the middle than an end of the car, a plurality of rolling wheels on each axle, for normally supporting the car in horizontal position, a third axle secured near one end of the car, said third axle being mounted in fixed relation to the body, a plurality of rolling tilting wheels concentrically mounted on the third axle, the parts being so arranged that the rolling wheels on the first-mentioned two axles extend a greater distance from the body than the tilting wheels on the third axle, the peripheries of said tilting wheels extending below the end of the car.

2. A car for handling material comprising a body, two pairs of running wheels mounted near the middle of the body for carrying the body along a horizontal support, a pair of tilting wheels near one end of the body, the tilting wheels being out of contact with the horizontal support when the car is riding on the running wheels, and the peripheries of said tilting wheels extending rearwardly and downwardly beyond the end of the car to rollingly support the car when the opposite end is being elevated.

3. A car for handling material, comprising a framework for carrying the material, a plurality of running wheels for carrying the body along a horizontal support, means carried at the lead-end of the car for detachably connecting that end of the car to elevating means, and a pair of tilting wheels extending below the framework at the trail end of the car, said tilting wheels being normally out of contact with a horizontal support when the car is moving thereover, but being adapted to rollingly support the car when the lead end is being elevated.

4. A car for handling material, comprising a body, wheels supporting the body, means carried at the lead end of the car for detachably connecting that end of the car to elevating means, a pair of tilting wheels extending below the framework at the trail end of the car, said tilting wheels being normally out of contact with a horizontal support when the car is moving thereover, but being adapted to rollingly support the car when the lead end is being elevated, and a pair of handles secured to the trail end of the car to guide the body in its tilting movements.

5. A car of the kind described comprising a plurality of wheels nearer the middle than an end of the car, a wheel toward the trail-end of the car, and means carried near the lead-end of the car for detachably connecting that end of the car to elevating means in a hoistway.

6. A car for handling material at and between different levels, comprising a wheeled truck, a superstructure for holding material while the car is wheeled on said truck and while the car is up-ended for transport along a hoistway, and means carried by the superstructure at an elevated point thereon near the lead-end of the car for connecting that end of the car to elevating means in a hoistway, said car also having a trailer wheeled-truck for rollingly supporting the trail-end of the car when the latter is up-ended at its lead-end on actuating said elevating means.

7. A car for handling material at and between different levels, comprising a wheeled truck, a superstructure for holding material while the car is wheeled on said truck and while the car is up-ended for transport along a hoistway, and means carried by the superstructure at an elevated point thereon near the lead-end of the car for connecting that end of the car to elevating means in a hoistway, said car also having a trailer wheeled-truck including a wheel at a higher level than the wheels of the first mentioned truck when the car is substantially horizontal, said wheel being then less elevated than said point.

8. A car for handling material at and between different levels, comprising a wheeled truck, a superstructure for holding material while the car is wheeled on said truck and while the car is up-ended for transport along a hoistway, said superstructure including a permanent superstructure unit at one point along the length of the car, said unit including a structure for holding material as aforesaid and a collapsible superstructure unit at another point along the length of the car, and means for detachably connecting the car to an elevating means in said hoistway to cause up-ending of the lead-end of the car when said elevating means is actuated.

9. A car for handling material at and between different levels, comprising a wheeled truck, and a superstructure for holding material while the car is wheeled on said truck and while the car is up-ended for transport along a hoistway, said superstructure including a permanent superstructure unit forming an upright transverse frame presenting a cut out opening near the lead-end of the car.

10. A car for handling material at and between different levels, comprising a wheeled truck, and a superstructure for holding material while the car is wheeled on said truck and while the car is up-ended for transport along a hoistway, said superstructure including a permanent superstructure unit at the trail-end of the car having side members and a roof or bridge member.

11. A car for handling material at and between different levels, comprising a wheeled truck, and a superstructure for holding material while the car is wheeled on said truck and while the car is up-ended for transport along a hoistway, said superstructure including a permanent superstructure unit near the trail-end of the car forming a roofed-over compartment having a forward opening substantially as large as the cross section of the compartment.

12. A car for handling material at and between different levels, comprising a wheeled truck, and a superstructure for holding material while the car is wheeled on said truck and while the car is up-ended for transport along a hoistway, said superstructure including a permanent superstructure unit at one point along the length of the car and a collapsible superstructure unit at another point along the length of the car, the last mentioned unit being collapsible on the car without affecting the maximum load capacity of the car.

13. A car for handling material at and between different levels, comprising a wheeled truck, a superstructure for holding material while the car is wheeled on said truck and while the car is up-ended for transport along a hoistway, and a plurality of means at different levels near the lead-end of the car for selective connection to a traction means operating at a particular level or to a traction means operating between different levels.

In testimony whereof I affix my signature.

JOHN WILLIAM SCOTT.